United States Patent Office 2,739,146
Patented Mar. 20, 1956

2,739,146

DISAZO-DYESTUFFS INSOLUBLE IN WATER

Reinhold Weigele and Richard Huss, Frankfurt am Main, Germany, assignors to Farbwerke Hoechst Aktiengesellschaft vormals Meister Lucius & Brüning, Frankfurt am Main, Germany, a company of Germany No Drawing. Application December 4, 1953, Serial No. 396,347

Claims priority, application Germany December 8, 1952

2 Claims. (Cl. 260—176)

The present invention relates to disazo-dyestuffs insoluble in water; more particularly, it relates to dyestuffs of the general formula

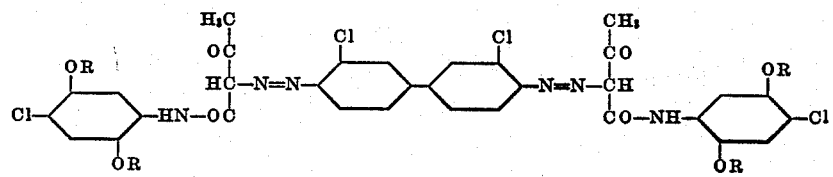

in which R represents a methyl or ethyl group.

In our co-pending U. S. application Serial No. 320,102, filed November 12, 1952, there is described a process for producing water-insoluble disazo-dyestuffs by coupling in substance or on a substratum suitable for the production of lakes the tetrazo compound of 4.4'-diamino-3.3'-dichlorodiphenyl with an acetoacetylaminobenzene of the general formula

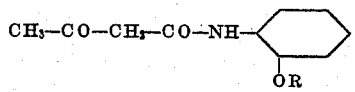

wherein R represents an alkyl or aryl radical.

The disazo-dyestuffs so obtained are water-insoluble pigments of a clear, yellow color which, owing to their coloring strength, their good fastness to solvents, light and transparency are especially suitable for coloring plastics, printing ink and for special applications in the lacquer, wallpaper and paper industries.

We have found that water-insoluble disazo-dyestuffs having the same good fastness properties and similar tints are obtained by coupling in substance, or on a substratum suitable for the production of lakes, the tetrazo-compound of 4.4'- diamino - 3.3'- dichlorodiphenyl with an acetoacetylaminobenzene of the following general formula

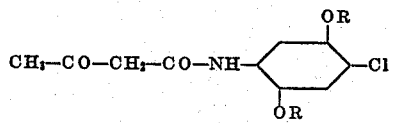

wherein R represents a methyl or ethyl group.

The new dyestuffs are clear yellow pigments of a greenish to reddish hue having a high coloring strength, a good fastness to solvents and a very good fastness to light. They are, therefore, especially suitable for coloring plastics, printing ink and for special applications in the lacquer, wallpaper and paper industries.

As compared with the dyestuff from tetrazotized 4.4'-diamino - 3.3' - dichlorodiphenyl and acetoacetylaminobenzene described in U. S. Patents Nos. 2,410,219 and 2,478,767 as well as the dyestuff obtainable by coupling tetrazotized 4.4'-diamino-3.3'-dimethoxydiphenyl with 1-acetoacetylamino - 2.5 - dimethoxy - 4 - cyanobenzene described in German Patent No. 842,819, the new dyestuffs are distinguished by a substantially improved fastness to light.

The following example serves to illustrate the invention, but it is not intended to limit it thereto, the parts being by weight unless otherwise stated, and the relationship of parts by weight to parts by volume being the same as that of the kilogram to the liter:

Example 50.6 parts of 4.4'-diamino-3.3'-dichlorodiphenyl are stirred with 600 parts by volume of water and 250 parts by volume of 5 N-hydrochloric acid. The mixture is then cooled with ice to 0° C., and tetrazotized at 0° C. with 52.5 parts by volume of a solution of sodium nitrite of 40 per cent. strength. The clarified tetrazo-solution is run, while stirring well, at 30° C.–33° C. into an acetic acid suspension of 115 parts of 1-acetoacetylamino-4-chloro-2.5-dimethoxybenzene of the formula

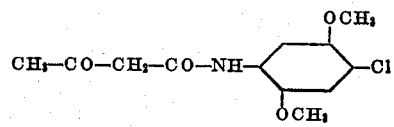

the pH value of the coupling medium being maintained at 5.5-4.5. When the formation of the dyestuff is complete, the mixture is boiled with steam, the dyestuff is then separated in the usual manner, washed until neutral and dried. The pigment so obtained constitutes a clear, reddish yellow powder which is distinguished by a high coloring strength and transparency as well as a very good fastness to light.

The coupling can be carried out with advantage in the presence of a resin soap.

By using in the above example 126 parts of 1-acetoacetylamino-4-chloro-2.5-diethoxybenzene instead of 115 parts of 1-acetoacetylamino-4-chloro-2.5-dimethoxybenzene, a somewhat more greenish yellow powder of similar fastness properties is obtained.

We claim:

1. The water-insoluble disazo-dyestuffs corresponding to the general formula:

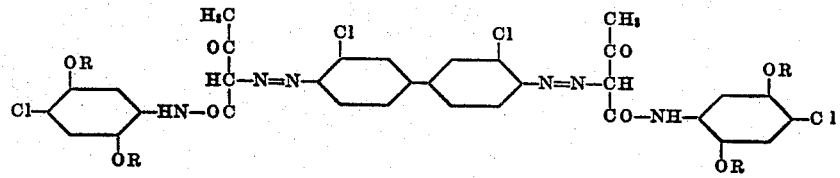

wherein R represents a member of the group consisting of methyl and ethyl.
2. The water-insoluble disazo-dyestuff corresponding to the following formula
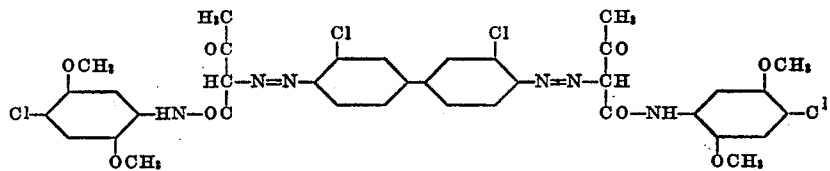
References Cited in the file of this patent
UNITED STATES PATENTS
| | | |
|---|---|---|
| 1,933,431 | Henle et al. | Oct. 31, 1933 |
| 2,410,219 | Langstroth | Oct. 29, 1946 |
| 2,453,692 | von Glahn | Nov. 16, 1948 |
| 2,478,767 | Locke | Aug. 9, 1949 |
| 2,657,204 | De Lucia et al. | Oct. 27, 1953 |